United States Patent

[11] 3,633,428

| [72] | Inventor | Richard Pott |
| | | Heiden, Germany |
| [21] | Appl. No. | 80,849 |
| [22] | Filed | Oct. 16, 1970 |
| [45] | Patented | Jan. 11, 1972 |
| [73] | Assignee | Westland Gummiwerke GmbH & Co. |
| | | Melle, Germany |

[54] CONVEYOR BELT
10 Claims, 3 Drawing Figs.

[52] U.S. Cl. .................................................. 74/231 R, 198/154
[51] Int. Cl. ............................................... F16g 1/00, B65g 15/00
[50] Field of Search ............................................ 74/231 R; 198/129, 154

[56] References Cited
UNITED STATES PATENTS

| 2,562,388 | 7/1951 | Petr, Jr. ..................... | 74/231 UX |
| 2,902,142 | 9/1959 | Girardi ...................... | 74/154 X |

*Primary Examiner*—Leonard H. Gerin
*Attorney*—Michael S. Striker

ABSTRACT: A conveyor belt for steep-path conveying has a main belt portion provided on its conveying surface with a plurality of projections which include with the conveying surface acute angles open in the direction of advancement of the conveyor. Corrugated sidewall portions extend along opposite margins of the main belt portion and project from the conveying surface thereof at opposite lateral sides of the projections, the corrugations of these sidewall portions being inclined in the predetermined direction of advancement of the belt and also including with the conveying surface respective acute angles.

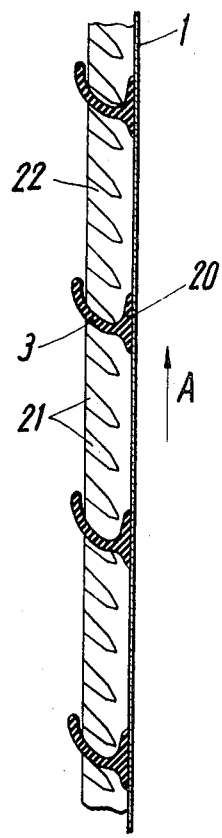
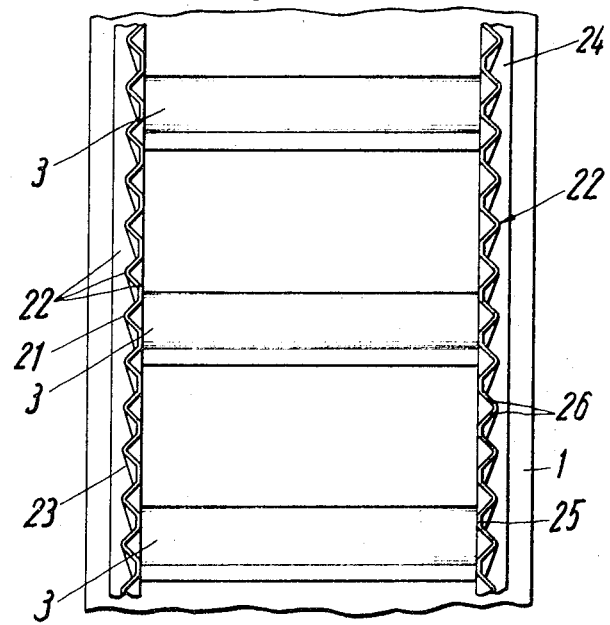
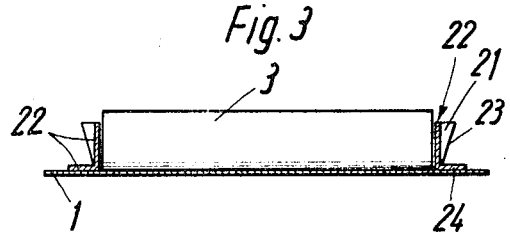

CONVEYOR BELT

BACKGROUND OF THE INVENTION

The present invention relates generally to conveyors, and more particularly to conveyors for steep-path conveying.

In steep-path conveying it is known to have conveyors whose upper conveying surface is provided with projections spaced from one another in the direction of advancement of the conveyor and including with the surface of the conveyor an acute angle which is open in the direction of advancement of the conveyor. Sidewall portions extend longitudinally of the conveyor belt and are connected with the ends of the projections, that is with the lateral ends thereof, so that the projections together with the sidewall portions in effect form scoops. It has been found, however, that under certain circumstances this prior art construction provides considerable difficulties. For instance, if it is necessary to convolute the belt through very small radii, such as during its change from one direction to another, the connection of the sidewalls with the projections is found disadvantageous because in the region of the sidewalls and the connection with the projections the stretching effect acting upon the various components is very great under such circumstances and can lead to damage.

SUMMARY OF THE INVENTION

It is, accordingly, an object of the present invention to overcome the aforementioned disadvantages.

More particularly it is an object of the present invention to provide an improved conveyor which is not possessed of these disadvantages.

An additional object of the present invention is to provide such an improved conveyor which is simple, reliable and durable in its construction.

In pursuance of the above objects, and others which will become apparent hereafter, one feature of the invention resides in a conveyor belt, particularly for steep-path conveying, which briefly stated comprises a main belt portion having a conveying surface and being advanceable in predetermined direction. A plurality of transversely extending conveying portions projects from the surface and includes therewith acute angles open in the predetermined direction. Corrugated sidewall portions extend along opposite margins of the main belt portion and project from the surface at opposite lateral sides of the projections, with the corrugations of the sidewall portions being inclined in the aforementioned predetermined direction and also including with the surface respective acute angles.

A conveyor belt so configurated assures that the constituent components are freely movable with respect to one another, while the conveying portions still include with the surface of the main belt portion an acute angle and are thus capable of conveying even if the belt or portions thereof must move through vertical or substantially vertical paths. Furthermore, lateral falling of the conveyed materials out of the respective scoops thus formed is prevented by the corrugated sidewall portions, with the end result being that the scoop configuration of the prior art is preserved but without the disadvantages which are attendant upon the prior art, particularly where the conveyor belt is to be convoluted through small radii.

Advantageously the convolutions of the sidewall portions are equally inclined on both lateral sides of the main belt portion and this prevents the undesired stretching of the sidewall portions when the belt is convoluted about guide rollers, reversing rollers or the like. In effect, any stretching forces acting upon the sidewall portions will tend to straighten out the corrugations thereof temporarily, but will be incapable of causing sufficient stress to actually cause damage to any of the components.

According to a further concept of the invention it is advantageous to have the sidewall portions inclined in outward direction, that is outwardly away from the margins of the main belt portion, or to provide it with convolutions which are so inclined. This increases the volumetric capacity of the individual scoops without having to increase the overall dimensions of the constituent components, and furthermore, corrugations in the sidewall components when so arranged will more readily fold one upon the other when this is necessary during passage of the belt around a roller or the like. They do not tend to interfere with one another when so configurated.

The novel features which are considered as characteristic for the invention are set forth in particularly in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a fragmentary side elevational view through one run of a conveyor belt according to the present invention;

FIG. 2 is a top plan view of FIG. 1, that is seen looking towards the right in that Figure; and FIG. 3 is a transverse section through the embodiments of FIGS. 1 and 2.

DESCRIPTION OF THE PREFERRED EMBODIMENTS

Discussing now the drawing in detail, that is FIGS. 1-3 thereof, it will be seen that reference numeral 1 designates a conveyor belt or main conveyor belt portion of which only a fragment is shown. The particular configuration and construction of the conveyor belt portion 1 may be in accordance with any suitable teaching of the prior art, but preferably such that it has a strong center or middle layer as a neutral zone in order to be able to withstand high stresses. Provided on the upper or conveying surface of the belt portion 1 are conveying portions 3 which extend transversely to the elongation of the belt portion 1, and therefore transversely to the direction of movement of the same which is indicated in FIG. 1 by the arrow. These conveying portions 3 project upwardly from the conveying surface and are so inclined thereto that they form acute angles therewith which are open in the direction of movement indicated by the arrow A.

It will be appreciated that although the novel conveyor belt is intended specifically for the conveying of materials through steep paths, that is vertically, substantially vertically, it can also be used for paths which are less steep although the advantages of the present invention will be most pronouncedly realized when the paths are in fact steep.

The projections 3 are provided at their undersides or lower sides with consolelike portions 20 extending to opposite sides as seen in the direction of the arrow A, with which they are connected with the belt portion 1 so that a bending of the projections 3 when material rests upon them as the belt moves upwardly at a steep angle, is largely prevented. These connecting and reinforcing portions 20 extend over the entire width of the projections 3, that is the dimension of the projections 3 in the direction transversely to the direction of advancement A.

Extending along the marginal portions of the portion 1 are corrugated sidewall portions 22 which are provided with corrugations inclined also in the direction of the arrow A and defining with the surface of the portion 1 acute angles. FIG. 1 shows particularly clearly how these corrugations 21 are inclined and it will also be clear from the drawing that the folding line 23 of the corrugations may either be vertical with respect to the surface of the belt portion 1, or, as in FIG. 3, at an angle of 15° to the vertical.

It is emphasized that the projections 3 and the sidewall portions 22 are unconnected with one another to make free movement of both relative to one another possible whenever necessary, for instance when the belt is convoluted about rollers or guides, and during its movement. The only connection in a wider sense is the fact that the base portion 24 of the sidewall portions 22 rests on the upper surface of the main belt portion 1 and is fastened therewith, as by vulcanization, whereas the base portions 20 of the projections 3 are also connected with the surface of the main belt portion 1, for instance also by vulcanization. However, no direct connection exists between the projections 3 and the sidewall portions 22. With this construction the individual components—that is the projections 3 and the sidewall portions 22—are forced to follow along with the movements of the main belt portion 1 but have freedom of movement with reference to one another so that a tearing or other damaging of these components is avoided.

As the drawing shows, particularly FIG. 3, the sidewall portions are essentially composed of the base strip or portion 24 and the wall portion or strip 25 which extends upwardly therefrom and which is formed with the corrugations 21 which taper in direction towards the base portion 24. The taper is one sided and, as the drawing shows, the corrugations are bounded by the triangular walls 26 which contact one another along the fold line 23 which is inclined in the direction of advancement (see arrow A in FIG. 1) and which in the illustrated embodiment is further inclined outwardly away from the respective marginal portions of the main belt portion 1. In other words, the folding line 23 is inclined in two directions, namely forwardly in the direction of movement as identified with the arrow A in FIG. 1, as well as transversely thereto outwardly away from the respective marginal portion of the main belt portion 1. With this construction is not only readily possible for a sidewall portion 22 to stretch or, if the manner in which the belt passes around a reversing or drive roller warrants it, to fold upon itself in the manner of a fan, but also the volumetric capacity of each scoop provided on the belt between the sidewall portions 22 and the respective projections 23 is advantageously increased in this way.

It is particularly advantageous that the construction according to the present invention largely prevents stretching of the sidewall portions and prevents damage if such stretching does in fact occur. Mostly, however, the sidewall portions will simply be able to fold in the manner of a fan as they together with the main belt portion 1 pass around a reversing roller or similar instrumentality. This does not adversely influence the conveying ability and capacity of the novel belt, but significantly improves the resistance of the belt to damage.

Of course, different materials may be utilized for the various components of the belt described herein. Thus, natural or synthetic rubber, or synthetic plastic materials can be used, and these may in turn be reinforced with various materials and elements well known from the art which form no part of the present invention. Also, the sidewall portions and the projections need not be connected with the main portion 1 by vulcanizing, but could be bonded thereto in other suitable manner, for instance by means of adhesives. The scoops will of course always be open and will have what may be called a generally U-shaped cross section with the open side of the scoop facing upwardly. The angle included between the surface of the main belt portion 1 and the inclined projections 3, as well as between this surface and the inclined corrugations of the sidewall portions 22, may be on the order of approximately 45°. Other angles are of course also possible.

It will be understood that each of the elements described above, or two or more together, may also find useful applications in other types of constructions differing from the types described above.

While the invention has been illustrated and described as embodied in a conveyor belt, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A conveyor belt, particularly for steep-path conveying, comprising a main belt portion having a conveying surface and being advanceable in a predetermined direction; a plurality of transversely extending conveying portions projecting from said surface and including therewith acute angles open in said predetermined direction; and corrugated sidewall portions extending along opposite margins of said main belt portion and projecting from said surface at opposite lateral sides of said projections, the corrugations of said sidewall portions being inclined in said predetermined direction and also including with said surface respective acute angles.

2. A conveyor belt as defined in claim 1, said projections being elongated transversely of said main belt portion and having a lower edge adjacent the same, and each of said projections including a base portion projecting along and secured to said surface partly behind and partly ahead of the respective projection.

3. A conveyor belt as defined in claim 1, said sidewall portions having upper edges, and said projections having upper marginal portions extending transversely of said main body portion and located above said upper edges, said upper marginal portions extending in at least substantial parallelism with said surface.

4. A conveyor belt as defined in claim 2, said base portions merging with the associated projections on respective lines of selected curvature.

5. A conveyor belt as defined in claim 1, said sidewall portions having outer sides facing away from said projections and provided with corrugations which taper one sidedly in direction towards said surface.

6. A conveyor belt as defined in claim 1, said corrugations respectively being bounded by two mutually inclined triangular wall sections meeting in a junction line which includes an acute angle with said surface.

7. A conveyor belt as defined in claim 6, said sidewall portions each being of one piece and including intermediate wall sections located between successive corrugations and extending normal to the transverse elongation of the respective projections.

8. A conveyor belt as defined in claim 6, said juncture line being inclined in said predetermined direction, and also in direction outwardly away from said projections at an acute angle with reference to a vertical on said surface.

9. A conveyor belt as defined in claim 1, said projections consisting at least predominantly of a first elastomeric material, and said sidewall portions consisting at least predominantly of a softer second elastomeric material.

10. A conveyor belt as defined in claim 1, said projections and sidewall portions being connected only to said main belt portion and not to each other for enabling relative movements between them.

* * * * *